Figure 1:
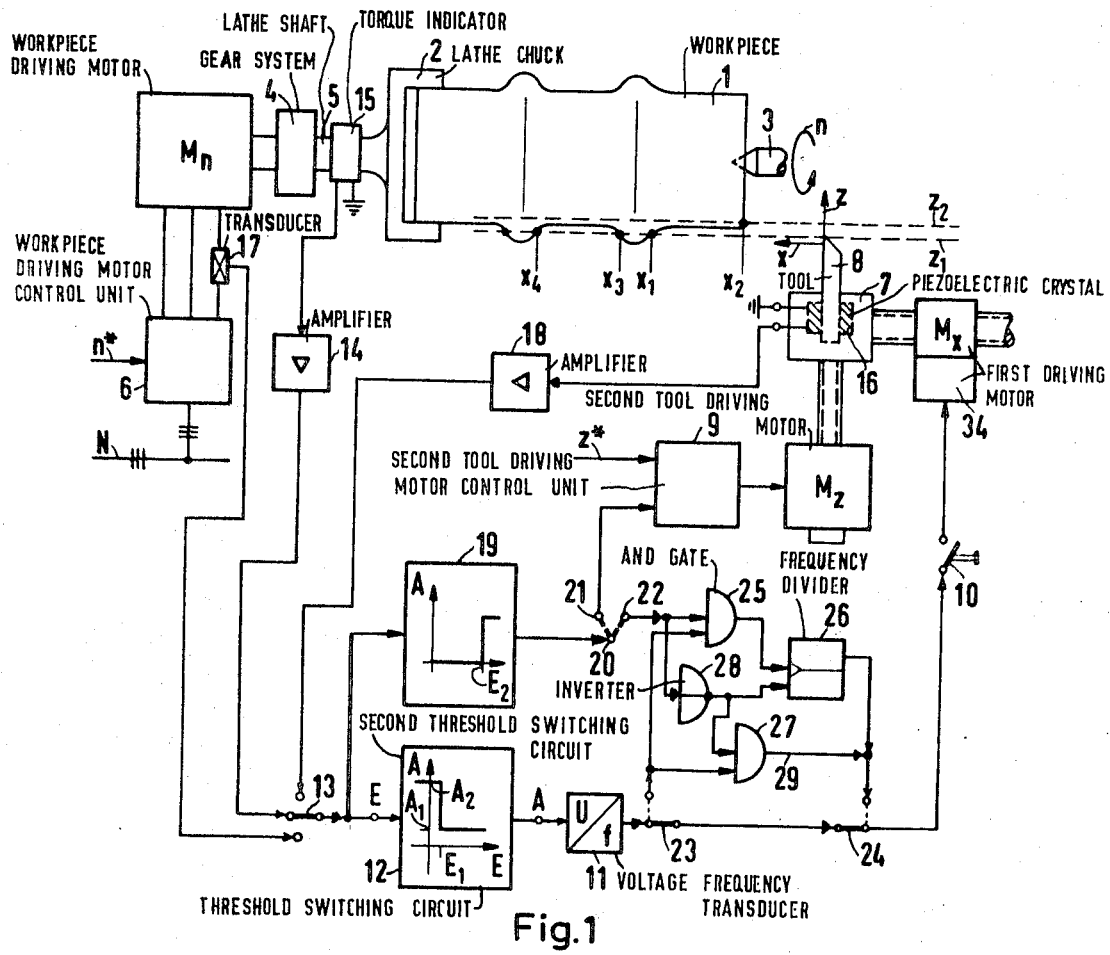

United States Patent

[11] 3,573,588

| [72] | Inventors | Werner Geyer<br>Nurnberg;<br>Rolf Klinge, Reutles; Jurgen Meyer,<br>Erlangen, Germany |
| --- | --- | --- |
| [21] | Appl. No. | 777,832 |
| [22] | Filed | Nov. 21, 1968 |
| [45] | Patented | Apr. 6, 1971 |
| [73] | Assignee | Siemens Aktiengesellschaft<br>Berlin, Munich, Germany |
| [32] | Priority | Nov. 28, 1967 |
| [33] | | Germany |
| [31] | | P 16 02 973.5 |

[54] AUTOMATIC FEED CONTROL SYSTEM FOR A MACHINE
10 Claims, 2 Drawing Figs.

[52] U.S. Cl. .................................................. 318/571,
318/39
[51] Int. Cl. ...................................................... G05b 19/24
[50] Field of Search ............................................ 318/20.110,
39

[56] References Cited
UNITED STATES PATENTS

| 3,273,182 | 9/1966 | McDonald | 318/1.8X(20.110UX) |
| --- | --- | --- | --- |
| 3,224,338 | 12/1965 | Reynolds | 318/39X |
| 3,325,710 | 6/1967 | Reynolds | 318/39 |
| 3,389,313 | 6/1968 | Reynolds | 318/39 |
| 3,418,549 | 12/1968 | Emerson et al. | 318/162X |

*Primary Examiner*—B. Dobeck
*Attorneys*—Curt M. Avery, Arthur E. Wilfond, Herbert L. Lerner and Daniel J. Tick

ABSTRACT: A magnitude which depends upon the forming power of a machine having a machine tool adapted to engage a workpiece is determined. The tool is rapidly driven while it is out of engagement with the workpiece. The drive of the tool is slowed when it engages the workpiece and the magnitude depending upon the forming power of the machine exceeds a lower threshold value.

3,573,588

AUTOMATIC FEED CONTROL SYSTEM FOR A MACHINE

DESCRIPTION OF THE INVENTION

The present invention relates to an automatic feed control system for a machine. More particularly, the invention relates to an automatic feed control system and method for a machine having a machine tool adapted to engage a workpiece.

Many machine tools are provided with rapid driving devices which permit the tool and the workpiece to move toward each other at a rapid velocity prior to the commencement of the actual machining process. In order to prevent damage to the tool or the workpiece it is necessary to reduce the speed at which the tool and workpiece, it is necessary to reduce the speed at which the tool and workpiece move together in sufficient time to insure that the tool does not contact the workpiece while the relative speed of the tool and the workpiece is high. The prevention of abutment of the tool and workpiece when said tool and workpiece are moving together at high speed requires considerable and extreme care and experience of the operating personnel.

The variation of driving speeds, as hereinbefore discussed, may also be achieved automatically by means of adjustable operating stops, members, cams, or the like, which react with the driving control. The adjustment of the operating members requires considerable accuracy and is time consuming, particularly when the surface configuration of the individual workpieces varies. Furthermore, the variation of the driving speed from a rapid to a slower operating speed must occur at a specific distance between the tool and the workpiece. This prevents the achievement of the shortest possible production time.

The principal object of the present invention is to provide a new and improved automatic feed control system and method for a machine. An object of the present invention is to provide an automatic feed control system and method for a machine, which system and method overcome the disadvantages of known systems and methods.

An object of the present invention is to provide an automatic feed control system for a machine, which system functions with efficiency, effectiveness and reliability.

An object of the present invention is to provide an automatic feed control system for a machine, which system is of simple structure and is accurate in operation.

In accordance with the present invention, a method of automatic feed control for a machine having a machine tool adapted to engage a workpiece with forming power, comprises determining a magnitude which depends upon the forming power of the machine. The tool is rapidly driven while it is out of engagement with the workpiece, The drive of the tool is slowed when it engages the workpiece and the magnitude depending upon the forming power of the machine exceeds a lower threshold value.

The workpiece may be formed by cutting and the magnitude which depends upon the forming power of the machine may then be the torque of the workpiece. The magnitude which depends upon the forming power of the machine may be the force on the tool. The drive of the tool is further slowed as long as the magnitude which depends upon the forming power of the machine exceeds an upper threshold limit.

In accordance with the present invention, apparatus for automatic feed control of a machine having a machine tool adapted to engage a workpiece with forming power, comprises workpiece driving means coupled to the workpiece for driving the workpiece. Workpiece driving control means electrically connected to the workpiece driving means controls the operation of the workpiece driving means. Tool driving means coupled to the tool drives the tool. Tool driving control means electrically connected to the tool driving means controls the operation of the tool driving means. Forming power means electrically connected to the tool driving control means provides a magnitude which depends upon the forming power of the machine and controls the tool driving control means in accordance with the magnitude which depends upon the forming power of the machine.

The tool driving control means includes threshold switching means having an input electrically connected to the forming power means and an output electrically connected to the tool driving means for producing an output voltage in accordance with the magnitude of an input voltage applied to its input. The threshold switching means comprises an amplifier having a positive feedback, a constant input voltage and an output. A relief circuit comprises first and second diodes having cathodes connected in common and providing the output voltage of the threshold switching means. The anode of the first diode is connected to the output of the amplifier and a constant direct voltage is applied to the anode of the second diode.

The tool driving control means includes threshold switching means having an input and an output electrically connected to the tool driving means for producing an output voltage in accordance with the magnitude of an input voltage applied to its input. The forming power means may comprise a torque indicator coupled to the workpiece driving means and electrically connected to the input of the threshold switching means of the tool driving control means. The forming power means may comprise a piezoelectric crystal positioned in the path of movement of the tool in abutment with the tool and electrically connected to the input of the threshold switching means of the tool driving control means.

The tool driving means comprises a first driving motor for driving the tool in directions along a first coordinate axis and a second driving motor for driving the tool in directions along a second coordinate axis perpendicular to the first coordinate axis. The tool driving control means comprises switching means and threshold switching means having an input electrically connected to the forming power means and an output electrically connected via the switching means to the first and second driving motors for producing an output voltage in accordance with the magnitude of the input voltage applied to its input. The first driving motor of the tool driving means comprises a step motor coupled to the tool and an electrohydraulic motor coupled to and driving the step motor. The tool driving control means further comprises voltage-frequency transducing means electrically connected between the output of the threshold switching means and the electrohydraulic motor.

The tool driving control means further comprises second threshold switching means having a common input with the threshold switching means and an output electrically connected to the switching means of the tool driving control means. The switching means includes a gate circuit having inputs and an output connected to a frequency divider. Switch means is electrically connectable between the voltage-frequency transducing means of the tool driving control means and an input of the gate means. Switch means is electrically connectable between the output of the second threshold switching means and another input of the gate means. Switch means is electrically connectable between the frequency divider and the electrohydraulic motor whereby the voltage-frequency transducing means is electrically connected to the electrohydraulic motor via the frequency divider under the control of the output voltage of the second threshold switching means.

In accordance with the present invention, the variation of the speed of approach between the tool and the workpiece occurs at a threshold point which is considerably beneath a dangerous limit. The various physical magnitudes may be utilized as the magnitude which depends upon the forming power of the machine. Such physical magnitudes of the machine include the power of the driving motors, the impact occurring upon the engagement of the tool with the workpiece, the slowing of the drive due to abutment of the tool with the workpiece, and so on. For the purposes of the present invention, the forming power must be determined as rapidly as possible. The forming power of the machine must be determined while conversions into ancillary magnitudes which are subject to inertia are avoided as much as possible, so that the forming power is rapidly determined. In machines which utilize cutting tools for shaping the workpiece such as, for example, in metal-cutting machines, lathes, planing machines, or the like, the torque of the workpiece or tool may be utilized, as hereinbefore described, as the magnitude which depends upon the forming power of the machine. This enables immediate determination of the machining force. A torque indicator of suitable type may thus be directly coupled to the drive of the workpiece or to the drive of the tool in order to determine the torque. A mechanical-electrical transducer of any suitable type such as, for example, a piezoelectric crystal, as hereinbefore described, may be utilized to determine a magnitude which depends upon the forming power by determining the force of movement of the tool.

Due to a drive which is too high or varying hardness of the workpiece, the forming power during the machining process may move toward exceeding a permissible maximum limit, the exceeding of which limit might cause breakage of the tool. In accordance with the present invention, the drive may be reduced and/or the movement of the tool is retarded during a period in which the forming power of the machine exceeds an upper threshold value. This permits automatic drive relative to the anticipated maximum force applied by the tool.

When there are large ratios of high driving velocities relative to the machining operation velocities, it is important, after a determination of the increase in power occurring when the tool engages the workpiece, to rapidly reduce the speed to that of the machining operation velocity. The system and method of automatic feed control of the present invention should utilize switching means which are controlled in accordance with specific threshold values for controlling the driving of the tool in mutually perpendicular coordinate axis directions, as hereinbefore described. The tool driving motor for driving the tool toward and away from the workpiece preferably comprises a step motor driven by an electrohydraulic motor, as hereinbefore described. The electrohydraulic motor is energized by a voltage-frequency transducer connected in the output of the threshold switching circuit of the tool driving control means, which threshold switching circuit responds to an increase in the forming power of the machine.

When the maximum permissible forming power of the machine is exceeded, the drive of the tool is decreased by the tool driving control means. This is accomplished by the second threshold switching means, hereinbefore described, which responds to the magnitude which depends upon the forming power of the machine and controls the operation of the electrohydraulic step motor of the machine tool via a frequency divider.

Limit value indicators may be utilized as the threshold switching circuit, to control switch means for appropriate switching of the voltage applied to the input of the voltage-frequency transducer. The threshold switching circuit, as hereinbefore described, may thus comprise a limit value indicator and switch connected in combination. The limit value indicator is a positive feedback amplifier having a constant input voltage and an output which is supplied to a relief circuit. The relief circuit comprises a pair of diodes having an input connected to the amplifier and another input connected to a source of constant direct voltage. The output is derived from the common connection between the diodes.

Figure 2:
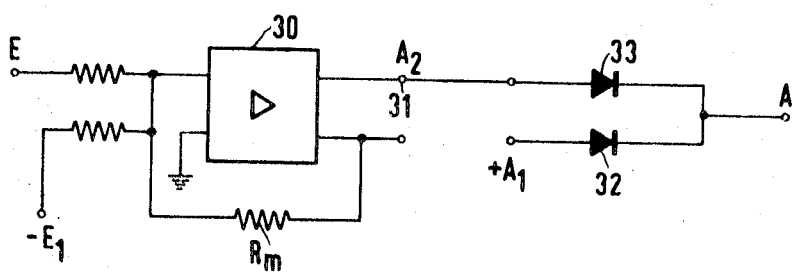

In order that the present invention may be readily carried into effect, it will now be described with reference to the accompanying drawing, wherein:

FIG. 1 is a block diagram of an embodiment of the automatic feed control system of the present invention; and FIG. 2 is a block diagram of an embodiment of the threshold switching circuit of the automatic feed control system of FIG. 1.

In order to describe the system and method of present invention, the machine is illustrated as comprising a workpiece 1 which is rotated about its longitudinal extending axis.

In FIG. 1, a workpiece 1, which may be of substantially cylindrical configuration, for example, is gripped at one end by a chuck 2 of a lathe and is held at its other end by a lathe centering component 3. A workpiece driving motor $M_n$ is energized from a 3 phase system N of electrical energy via a workpiece driving motor control unit 6. The workpiece driving motor $M_n$ is coupled to the chuck 2 of the lathe via a gear system 4 of any suitable type and the lathe spindle or shaft 5. The workpiece driving motor $M_n$ rotates the workpiece 1 about its axis in rotary direction $n$, as indicated by the arrow. The workpiece driving motor control unit 6 functions to control the speed of operation of the workpiece driving motor $M_n$ in accordance with a magnitude $n^*$ supplied to said control unit.

A machine cutting tool 8 is mounted on a support 7 which is moved in directions along an X coordinate axis by a first tool driving motor $M_x$, as indicated by an arrow $x$. The first driving motor $M_x$ is a step motor and is driven by an electrohydraulic motor 34, so that said first tool driving motor is an electrohydraulic step motor. The support 7, and therefore the cutting tool 8 mounted thereon, is moved in directions along a Z coordinate axis, as indicated by the arrow $z$, by a second tool driving motor $M_z$. Each of the first and second tool driving motors $M_x$ and $M_z$ is mechanically applied to the tool support 7 by any suitable means such as, for example, a threaded member or shaft.

The second tool driving motor $M_z$ is controlled in operation by a second tool driving motor control unit 9 in accordance with a magnitude $z^*$ which is supplied to said control unit. Each of the first and second tool driving motors $M_x$ and $M_z$ is a step motor which converts a pulse sequence supplied thereto into an angle of rotation corresponding exactly with the number of input pulses. The velocity of each of the tool driving motors thus corresponds to the frequency of the input pulse sequence.

The input to the first tool driving motor $M_x$, 34 is electrically connected to the output of a threshold switching circuit 12 via a voltage-frequency transducer 11 and a switch 10. The threshold switching circuit 12 produces an output voltage A in accordance with an input voltage E. When the input voltage E exceeds in magnitude a threshold value $E_1$, as indicated in the block representing the threshold switching circuit 12, the output voltage A is reduced in magnitude from a voltage $A_2$ to a voltage $A_1$, as indicated in said block.

The input voltage E may be applied to the threshold switching circuit by any of the three different arrangements. When a switch 13 is in the position shown in FIG. 1, wherein its switch arm makes electrical contact between the input of the threshold switching circuit 12 and an amplifier 14, the input voltage E is provided by a torque indicator 15. The torque indicator 15 is mounted in operative proximity with the lathe shaft 5 between the gear system 4 and the chuck 2. The torque indicator 15 may comprise any suitable device for providing an electrical signal indicative of the torque of the lathe shaft 5 and thereby having a magnitude which depends upon the forming power of the machine. The torque indicator 15 may thus comprise a known type of measurand transducer which functions by indication or by expansion gauges.

The torque indicator must be positioned as closely as possible to the lathe chuck 2, since this permits an especially rapid determination of the torque occurring upon the initiation of the forming operation of the machine. The electrical signal produced by the torque indicator 15, which has a magnitude which depends upon the forming power of the machine, is supplied to and amplified by the amplifier 14. The amplified torque indicator signal is supplied from the amplifier 14 to the input of the threshold switching circuit 12 via the switch arm of the switch 13.

Another arrangement for providing an input signal to the threshold switching circuit 12, which signal has a magnitude which depends upon the forming power of the machine, requires that the switch arm of the switch 13 be rotated clockwise so that it makes electrical contact between an amplifier 18 and the input to the threshold switching circuit 12. In such arrangement, a piezoelectric crystal 16 is mounted on the tool support 7 in the path of movement of the tool 8 in abutment with said tool. The piezoelectric crystal 16 is electrically connected to the amplifier 18, so that the electrical signal produced by said crystal, which has a magnitude which depends upon the forming power of the machine, is amplified by said amplifier and is supplied to the input of the threshold switching circuit 12 via the switch arm of the switch 13.

When the rotating workpiece has a smaller mass, and particularly when there is no gear system 4 coupled between the workpiece driving motor $M_n$ and the lathe chuck 2, the torque of the lathe shaft 5 may be derived directly from the current of said workpiece driving motor. The torque may thus be provided by a suitable measurand transducer 17, which may comprise, for example, a resistor, connected in one of the electrical conductors between the workpiece driving motor control unit 6 and the workpieces driving motor $M_n$. The output of the transducer 17 has a magnitude which depends upon the torque of the workpiece driving motor $M_n$ and therefore depends upon the forming power of the machine. The output electrical signal of the transducer 17 is supplied to the input of the threshold switching circuit 12 via the switch arm of the switch 13 when said switch arm is rotated counterclockwise so that it makes electrical contact between said transducer and the input of said threshold switching circuit.

When there is no engagement, contact or abutment of the tool 8 and the workpiece 1, the lathe spindle 5 has only a small idling torque. The torque indicator 15 thus produces an electrical signal of small magnitude indicating a small torque and therefore small forming power of the machine. The amplified output signal of the torque indicator 15, as supplied to the input of the threshold switching circuit 12, then has a magnitude which is less than the threshold level or value $E_1$. The threshold switching circuit 12 thus produces produces a maximum magnitude output voltage $A_2$.

When the switch 10 is manually closed, the high magnitude output voltage $A_2$ of the threshold switching circuit 12 is converted to a high frequency by the voltage-frequency transducer 11 and said frequency is supplied to the first tool driving motor 34, via the voltage-frequency transducer 11, switches 23 and 24 and the switch 10, and drives the tool support 7, and therefore the tool 8, at high speed in the direction $x$. The tool 8 is driven by the second tool driving motor $M_z$ in the $z$ direction until it reaches a level $z_1$, under the control of the input $z^*$ supplied to the second tool driving motor control unit 9. The first tool driving motor 34 drives the tool 8 in the $x$ direction at high speed until said tool abuts the workpiece 1 at a point $x_1$.

When the tool 8 abuts the workpiece 1 at the point $x_1$, the torque of the lathe shaft 5 increases due to the increased load on the workpiece driving motor $M_n$ and the increased output of said workpiece driving motor. When the torque of the lathe shaft 5 increases, due to engagement of the tool 8 with the workpiece 1, the output signal of the torque indicator 15 increases in magnitude, thereby indicating an increase in the forming power of the machine. The amplified signal produced by the torque indicator 15 thus has a magnitude which is higher than the threshold level $E_1$, so that when said amplified signal is applied to the input of the threshold switching circuit 12, said threshold switching circuit produces an output voltage $A_1$. The output voltage $A_1$ has a magnitude which is less than that of the previous output voltage $A_2$. The first tool driving motor 34 responds almost immediately to the decreased frequency supplied to its input by the voltage-frequency transducer 11 and reduces its speed accordingly to a decreased operating velocity.

The machining process continues, with the tool 8 cutting the protruding portion of the workpiece 1 which extends beyond the level $z_1$. When the tool 8 reaches a point $x_3$ of the workpiece 1, it is removed from engagement with said workpiece, so that the torque returns to its idling value and the threshold switching circuit 12 produces the output voltage $A_2$ of higher magnitude. The first tool driving motor is thus energized by a higher frequency and drives the tool 8 at the higher velocity until said tool again abuts the workpiece 1 at a point $x_4$ of said workpiece. The same operation is then repeated as when the tool 8 abuts the point $x_1$ of the workpiece 1.

Upon completion of the machining process, the first tool driving motor 34 is reversed in its driving direction and rapidly returns the tool support 7 and the tool 8 to its initial position. The second tool driving motor $M_z$ then drives the tool support 7 and the tool 8, under the control of the second tool driving motor control unit 9, and in accordance with the input magnitude $z^*$, to a level $z_2$. The operation of the apparatus of the present invention is then repeated, as hereinbefore described, with the first tool driving motor 34 driving the tool 8 at high velocity toward the workpiece 1 until said tool abuts said workpiece at a point $x_2$ of said workpiece. The driving velocity of the first tool driving motor 34 is then decreased, in the aforedescribed manner, and remains so until the tool 8 and the workpiece 1 are removed from contact with each other.

In order to prevent damage or destruction of the tool 8, because the initially high driving velocity of said tool is too high, a second threshold switching circuit 19 is connected with its input in common with the input of the threshold switching circuit 12. The signal having a magnitude which depends upon the forming power of the machine, as supplied by any of the torque indicator 15, the piezoelectric crystal 16 or the transducer 17, is thus supplied to the input of the second threshold switching circuit 19 as well as to the input of the threshold switching circuit 12. The second threshold switching circuit 19 is the same as the threshold switching circuit 12, with the exception that it is adjusted to a threshold level $E_2$, as indicated in the block representing said second threshold switching circuit. The threshold level $E_2$ of the second threshold switching circuit 19 corresponds to the permissible forming power of the machine.

The output voltage of the second threshold switching circuit 19, which is in accordance with the magnitude of the input voltage applied to its input, either decreases the driving of the tool 8 by the second tool driving motor $M_z$ or reduces the driving velocity of said tool by the first tool driving motor 34. A switch 20, 21, 22 is thus provided in the output of the second threshold switching circuit 19. When the switch arm of the switch 20, 21, 22 makes electrical contact between the terminal 20 and the terminal 21, the drive of the tool 8 by the second tool driving motor $M_z$ is reduced. When the switch arm of the switch 20, 21, 22 makes electrical contact between the terminals 20 and 22, the output of the second threshold switching circuit 19 is connected to an input of an AND gate 25. The other input of the AND gate 25 is connected to the output of the voltage-frequency transducer 11 when the switch arm of the switch 23 is rotated counterclockwise so that it makes electrical contact between said transducer and said AND gate.

The output voltage of the second threshold switching circuit 19 is also applied to the input of an inverter 28 when the switch arm of the switch 20, 21, 22 makes electrical contact between its terminals 20 and 22. The output of the AND gate 25 and the output of the inverter 28 are connected to corresponding inputs of a frequency divider 26. The output of the inverter 28 is also connected to an input of another AND gate 27. The other input of the AND gate 27 is connected to the output of the voltage-frequency transducer 11 when the switch arm of the switch 23 makes electrical contact between said transducer and the AND gate 25. The output of the AND gate 27 is connected to the input of the first tool driving motor 34 in common with the output of the frequency divider 26 via a lead 29 when the switch arm of the switch 24 is rotated in a clockwise direction so that it makes electrical contact between the outputs of said frequency divider and said AND gate and said first tool driving motor. The switches 23 and 24 are coordinated, so that they are either both in their positions shown in FIG. 1 or both in their positions indicated by broken lines in FIG. 1.

When the switch arm of the switch 20, 21, 22 makes electrical contact between the terminals 20 and 21 thereof, and the input voltage E applied to the input of the second threshold switching circuit 19 exceeds the upper threshold level $E_2$, the output voltage of said second threshold switching circuit is applied to the second tool driving motor control unit 9 and functions to decrease the drive of the tool 8 by the second tool driving motor $M_Z$. When the switch arm of the switch 20, 21, 22 makes electrical contact between its terminals 20 and 22, and the input voltage applied to the second threshold switching circuit 19 exceeds in magnitude the upper threshold level $E_2$, the switch arms of the switches 23 and 24 are rotated in coordination to their positions shown in broken lines in FIG. 1. The output voltage of the second threshold switching circuit 19 is then applied to the AND gate 25. The output signal pulses of the voltage-frequency transducer 11 are also applied to the AND gate 25, so that said AND gate is switched to its conductive condition and transfers said output signal pulses to the input of the frequency divider 26.

The frequency divider 26 may comprise any suitable frequency divider such as, for example, a bistable multivibrator or flip-flop which produces a number of output pulses which is half the number of input pulses. If a greater frequency reduction than half is required or desired, a number of flip-flops may be connected in sequence with each other in a known manner to provide such greater frequency reduction.

When the AND gate 25 is in its conductive condition, due to the application thereto of the output voltage of the second threshold switching circuit 19, the inverter 28 produces a zero output signal, so that the AND gate 27 is maintained in its nonconductive condition. If the input voltage applied to the second threshold switching circuit 19 decreases to a magnitude less than the threshold level $E_2$, said second threshold switching circuit produces a zero output voltage. The AND gate 25 is then maintained in its nonconductive condition. The zero input signal to the inverter 28 appears as an output signal of said inverter and said output signal switches the AND gate 27 is in its conductive condition, the output signal pulses of the voltage-frequency transducer 11 supplied to said AND gate are transferred by said AND gate via the lead 29, so that they bypass the frequency divider 26. The output signal of the inverter 28 is supplied to the frequency divider 26 and produces a zero output voltage of said frequency divider.

The apparatus and method of the present invention for automatic feed control of a machine are readily adaptable for use with milling machines, as well as cutting machines. The only difference is that the kinematic condition of the tool and workpiece are reversed so that the tool is rotated while the workpiece is driven toward the tool. In the illustrated example of the apparatus of the present invention, as shown in FIG. 1, the machine may perform as a planer when the tool is rotated 90° about its longitudinal axis. It may then not be necessary to rotate the workpiece 1. When the machine is so operated, it is preferable to rotate the switch arm of the switch 13 in a clockwise direction so that it makes electrical contact between the amplifier 18 of the piezoelectric crystal 16 and the inputs of the threshold switching circuit 12 and the second threshold switching circuit 19. The system and method of the present invention are especially advantageous when used with planing machinery, since it is often necessary in such machinery to vary the driving velocity from a rapid to a slower operating velocity, and workpieces having irregular surfaces are very often machined. The system and method of the present invention may also be advantageously utilized with many types of machine tools which form a workpiece without cutting it. The principal necessity is to provide a suitable means for rapidly determining a magnitude which depends upon the forming power of the machine.

FIG. 2 is an embodiment of the threshold switching circuit 12 or the second threshold switching circuit 19 of FIG. 1. In FIG. 2, a positive direct input voltage E is applied to an input of a differential amplifier 30 of any suitable type via a resistor 41. A constant negative direct voltage $-E_1$ is also applied to the input of the differential amplifier 30. The constant voltage $-E_1$ is applied to the amplifier 30 via a resistor 42. The differential amplifier 30 has a positive feedback, via a feedback resistor $R_m$. The other input of the differential amplifier 30 is connected to a point at ground potential.

A relief circuit comprises a first diode 33 and a second diode 32. The cathodes of the diodes 33 and 32 are connected in common and the output voltage A of the threshold switching circuit of FIG. 2 is derived from said cathodes in common. The output of the differential amplifier 30 is connected to the anode of the first diode 33 of the relief circuit via an output terminal 31 of said amplifier. A constant positive direct voltage $A_1$ is applied to the anode of the second diode 32 of the relief circuit. The positive feedback resistor $R_m$ is adjusted in a manner whereby the amplifier 30 may switch rapidly in operation.

When the input voltage E is zero or of very small magnitude, the differential amplifier 30 produces an output voltage $A_2$ at its output terminal 31 which has a maximum positive magnitude, which exceeds the magnitude of the positive direct voltage $A_1$ applied to the anode of the second diode 32. The second diode 32 is thus switched to its nonconductive condition, whereas the first diode 33 is switched to its conductive condition and transfers the voltage $A_2$ to the output terminal as the output voltage A of the threshold switching circuit. The threshold switching circuit of FIG. 2 continues to provide the output voltage $A_2$ until the input voltage E increases positively in magnitude and exceeds the magnitude of the direct voltage $-E_1$ applied to the input of the amplifier 30. When the input voltage E exceeds the voltage $-E_1$ in magnitude, the amplifier 30 produces a negative output voltage at its output terminal 31. The negative output voltage switches the first diode 33 to its nonconductive condition, and since the direct voltage $A_1$ is more positive than the output voltage of said amplifier, the second diode 32 is switched to its conductive condition and transfers said voltage $A_1$ to the output terminal as the output voltage of the threshold switching circuit.

The direct voltages $-E_1$ and $+A_1$ may be varied to adjust, within a wide range, the threshold level of operation, as well as the magnitude of the signal produced when the threshold level is exceeded in magnitude. This therefore enables simple adjustment of the apparatus of the present invention to suit specific requirements of operation.

While the invention has been described by means of specific examples and in a specific embodiment, we do not wish to be limited thereto, for obvious modifications will occur to those skilled in the art without departing from the spirit and scope of the invention.

We claim:

1. A method of automatic feed control for a machine having a machine tool adapted to engage a workpiece with forming power, said method comprising:
   determining a magnitude which depends upon the forming power of the machine;
   rapidly driving the tool while it is out of engagement with the workpiece;
   slowing the drive of the tool when it engages the workpiece and the magnitude depending upon the forming power of the machine exceeds a lower threshold value; and
   further slowing the drive of the tool as long as the magnitude which depends upon the forming power of the machine exceeds an upper threshold value.

2. A method as claimed in claim 1, wherein the workpiece is formed by cutting and the magnitude which depends upon the forming power of the machine is the torque of the workpiece.

3. A method as claimed in claim 1, wherein the workpiece is formed by cutting, and the magnitude which depends upon the forming power of the machine is the force on the tool.

4. Apparatus for automatic feed control of a machine having a machine tool adapted to engage a workpiece with forming power, said apparatus comprising:
   workpiece driving means coupled to said workpiece for driving said workpiece;

workpiece driving control means electrically connected to said workpiece driving means for controlling the operation of said workpiece driving means;

tool driving means coupled to said tool for driving said tool, said tool driving means comprising a first driving motor for driving said tool in directions along a first coordinate axis and a second driving motor for driving said tool in directions along a second coordinate axis perpendicular to the first coordinate axis;

tool driving control means electrically connected to said tool driving means for controlling the operation of said tool driving means, said tool driving control means comprising switching means and threshold switching means having an input electrically connected to said forming power means and an output electrically connected via said switching means to said first and second driving motors for producing an output voltage in accordance with the magnitude of the input voltage applied to its input; and forming power means electrically connected to said tool driving control means for providing a magnitude which depends upon the forming power of the machine and controlling said tool driving control means in accordance with the magnitude which depends upon the forming power of the machine.

5. Apparatus as claimed in claim 4, wherein said tool driving control means includes threshold switching means having an input and an output electrically connected to said tool driving means for producing an output voltage in accordance with the magnitude of an input voltage applied to its input, and said forming power means comprises a torque indicator coupled to said workpiece driving means and electrically connected to the input of the threshold switching means of said tool driving control means.

6. Apparatus as claimed in claim 4, wherein said tool driving control means includes threshold switching means having an input and an output electrically connected to said tool driving means for producing an output voltage in accordance with the magnitude of an input voltage applied to its input, and said forming power means comprises piezoelectric crystal means positioned in the path of movement of the tool in abutment with said tool and electrically connected to the input of the threshold switching means of said tool driving control means.

7. Apparatus as claimed in claim 4, wherein the first driving motor of said tool driving means comprises a step motor coupled to said tool and an electrohydraulic motor coupled to and driving said step motor, and said tool driving control means further comprises voltage-frequency transducing means electrically connected between the output of said threshold switching means and said electrohydraulic motor.

8. Apparatus for automatic feed control of a machine having a machine tool adapted to engage a workpiece with forming power, said apparatus comprising:

workpiece driving means coupled to said workpiece for driving said workpiece;

workpiece driving control means electrically connected to said workpiece driving means for controlling the operation of said workpiece driving means;

tool driving means coupled to said tool for driving said tool, said tool driving means comprising a first driving motor for driving said tool in directions along a first coordinate axis and a second driving motor for driving said tool in directions along a second coordinate axis perpendicular to the first coordinate axis, the first driving motor of said tool driving means comprising a step motor coupled to said tool and an electrohydraulic motor coupled to and driving said step motor;

tool driving control means electrically connected to said tool driving means for controlling the operation of said tool driving means, said tool driving control means comprising switching means and threshold switching means having an input electrically connected to said forming power means and an output electrically connected via said switching means to said first and second driving motors for producing an output voltage in accordance with the magnitude of the input voltage applied to its input;

voltage-frequency transducing means electrically connected between the output of said threshold switching means and said electrohydraulic motor;

second threshold switching means having a common input with said threshold switching means and an output electrically connected to the switching means of said tool driving control means, and said switching means includes a gate circuit having inputs and an output connected to a frequency divider, switch means electrically connectable between the voltage-frequency transducing means of said tool driving control means and an input of said gate means, switch means electrically connectable between the output of said second threshold switching means and another input of said gate means and switch means electrically connectable between said frequency divider and said electrohydraulic motor whereby said voltage-frequency transducing means is electrically connected to said electrohydraulic motor via said frequency divider under the control of the output voltage of said second threshold switching means; and forming power means electrically connected to said tool driving control means for providing a magnitude which depends upon the forming power of the machine and controlling said tool driving control means in accordance with the magnitude which depends upon the forming power of the machine.

9. Apparatus as claimed in claim 8, wherein said threshold switching means comprises amplifier means having a positive feedback, a constant input voltage and an output and a relief circuit comprising first and second diodes having cathodes connected in common and providing the output voltage of said threshold switching means, means connecting the anode of the first diode to the output of said amplifier means and means for applying a constant direct voltage to the anode of the second diode.

10. Apparatus for automatic feed control of a machine having a machine tool adapted to engage a workpiece with forming power, said apparatus comprising:

workpiece driving means coupled to said workpiece for driving said workpiece;

workpiece driving control means electrically connected to said workpiece driving means for controlling the operation of said workpiece driving means;

tool driving means coupled to said tool for driving said tool, said tool driving control means including threshold switching means having an input electrically connected to said forming power means and an output electrically connected to said tool driving means for producing an output voltage in accordance with the magnitude of an input voltage applied to its input, said threshold switching means comprising amplifier means having a positive feedback, a constant input voltage and an output and a relief circuit comprising first and second diodes having cathodes connected in common and providing the output voltage of said threshold switching means, means connecting the anode of the first diode to the output of said amplifier means and means for applying a constant direct voltage to the anode of the second diode;

tool driving control means electrically connected to said tool driving means for controlling the operation of said tool driving means; and forming power means electrically connected to said tool driving control means for providing a magnitude which depends upon the forming power of the machine and controlling said tool driving control means in accordance with the magnitude which depends upon the forming power of the machine.